(12) United States Patent
Arias et al.

(10) Patent No.: US 7,029,824 B2
(45) Date of Patent: Apr. 18, 2006

(54) POSITIVE WORKING THERMAL IMAGING ASSEMBLY OR STRUCTURE, METHOD FOR THE MANUFACTURE THEREOF AND PRODUCTS USED AS LITHOGRAPHIC PRINTING PLATES AND THE LIKE

(75) Inventors: Andre Luiz Arias, Rio de Janeiro (BR); Luiz Nei Arias, Rio de Janeiro (BR); Marjorie Arias, Rio de Janeiro (BR); Mario Italo Provenzano, Rio de Janeiro (BR)

(73) Assignee: IBF Industria Brasileira De Filmes Ltda., Rio de Janeiro (BB)

( * ) Notice: Subject to any disclaimer, the term of this patent is extended or adjusted under 35 U.S.C. 154(b) by 0 days.

(21) Appl. No.: 10/726,623

(22) Filed: Dec. 4, 2003

(65) Prior Publication Data
US 2004/0152018 A1    Aug. 5, 2004

Related U.S. Application Data

(63) Continuation-in-part of application No. 10/343,234, filed as application No. PCT/BR02/00075 on May 29, 2002, now abandoned.

(30) Foreign Application Priority Data
May 31, 2001  (BR) ............................... PI 0102218

(51) Int. Cl.
G03F 7/038    (2006.01)
G03F 7/039    (2006.01)
G03F 7/11     (2006.01)

(52) U.S. Cl. .................. 430/273.1; 430/271.1; 430/272.1; 430/275.1; 430/278.1; 430/327; 430/964

(58) Field of Classification Search ............ 430/271.1, 430/273.1, 327, 272.1, 275.1, 278.1, 964
See application file for complete search history.

(56) References Cited

U.S. PATENT DOCUMENTS 6,004,728 A * 12/1999 Deroover et al.

(Continued)

FOREIGN PATENT DOCUMENTS

EP    0 943 451    9/1999

(Continued)

Primary Examiner—Richard L. Schilling
(74) Attorney, Agent, or Firm—Finnegan, Henderson, Farabow, Garrett & Dunner, L.L.P.

(57) ABSTRACT

A positive working thermal imaging assembly comprising: A) a substrate; and B) a thermally sensitive imaging element of a composite layer structure comprising: (I) a first layer on the substrate of a polymeric material soluble in aqueous alkali solution, optionally containing compounds that absorb and convert light to heat and/or a coloured dye or pigment; said first layer being converted at its surface by treatment with solutions at elevated temperatures that contain an active compound or compounds capable of rendering said first polymeric material less soluble in an aqueous alkali developer at the point of contact; the first layer being oleophilic; (ii) optionally, a first intermediate layer between the substrate and the said first layer with a second polymeric material which is soluble or dispersible in aqueous solution optionally containing compounds that absorb and convert light or radiation to heat and/or a coloured dye or pigment coated from a solvent that does not substantially dissolve the first layer; and (iii) optionally, a third or top layer over the converted first layer and composed of a second polymeric material which is soluble or dispersible in aqueous solution optionally containing compounds that absorb and convert light or radiation to heat and/or a visible coloured dye or pigment; the first intermediate layer and the third layer being applied with a solvent that does not substantially dissolve the converted first layer.

44 Claims, 1 Drawing Sheet

U.S. PATENT DOCUMENTS

Figure 1:
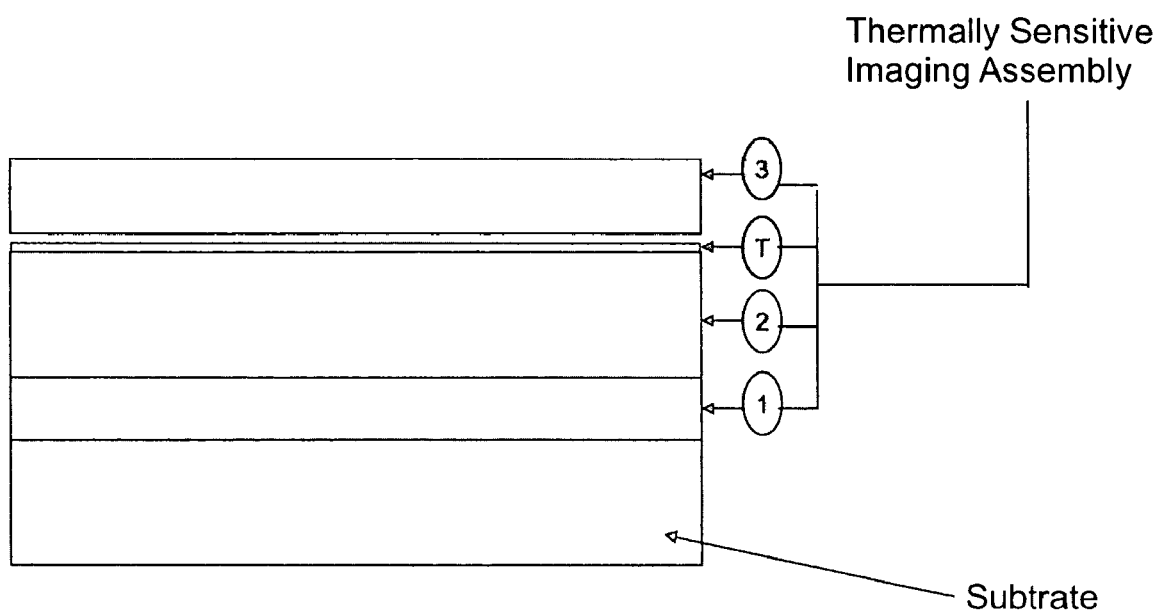

| | | | |
|---|---|---|---|
| 6,083,663 A * | 7/2000 | Vermeersch et al. | |
| 6,153,353 A * | 11/2000 | Van Damme et al. | |
| 6,342,336 B1 * | 1/2002 | Verschueren et al. | |
| 6,352,811 B1 | 3/2002 | Patel et al. | 430/270.1 |
| 6,352,812 B1 * | 3/2002 | Shimazu et al. | |
| 6,358,669 B1 * | 3/2002 | Savariar-Hauck et al. | |
| 6,391,517 B1 * | 5/2002 | Verschueren et al. | |
| 6,534,238 B1 * | 3/2003 | Savariar-Hauck et al. | |
| 6,613,494 B1 * | 9/2003 | Savariar-Hauck et al. | |

FOREIGN PATENT DOCUMENTS

| | | |
|---|---|---|
| WO | WO 99/67097 | 12/1999 |
| WO | WO 01/45958 | 6/2001 |

* cited by examiner

POSITIVE WORKING THERMAL IMAGING ASSEMBLY OR STRUCTURE, METHOD FOR THE MANUFACTURE THEREOF AND PRODUCTS USED AS LITHOGRAPHIC PRINTING PLATES AND THE LIKE

This application is a Continuation in Part application of the previous U.S. application U.S. Ser. No. 10/343,234 filed on Jan. 30, 2003 now abn and equivalent to PCT/BR02/00075 filed on May 29, 2002.

FIELD OF THE INVENTION

The invention relates to new positive working thermal imaging assembly or structure, especially suitable as lithographic printing plates, color proofing films and photoresists produced with aluminum or polyester substrates.

Compositions used for heat sensitive lithographic printing plates are well-known in the art. Imaging on such plates occurs through the action of infrared radiation which, upon striking on the radiation sensitive composition, changes its solubility in the developer, the non-exposed area solubility remaining unchanged. In the case of a positive plate, the area exposed to radiation becomes developer-soluble while in a negative plate the exposed area becomes insoluble.

As examples of patents disclosing radiation sensitive compositions and printing plates containing the same it can be mentioned U.S. Pat. Nos. 4,708,925; 5,286,612; 5,372,915; 5,491,046; 5,466,557; PCT/GB97/01117; PCT/GB95/02774 and U.S. Pat. No. 6,060,218.

U.S. Pat. No. 5,491,046 describes an example of printing plate containing a radiation sensitive composition, such composition containing a novolak phenolic resin, a resol phenolic resin, a Broensted acid, and an infrared absorber. However, a resin for such radiation sensitive composition requires a combination of a resol resin and a novolak resin. If, for example, novolak resin is omitted, there will be no imaging and when the layer is put into contact with the developer it will be removed together with that portion which was not exposed. Accordingly, the plate thus processed is no good for use. In the compositions disclosed in that patent, the area exposed to radiation in order to imaging requires a heating step before it can be developed. Moreover, such plates require highly alkali developers which are subject to react with carbon dioxide.

PCT/GB97/01117 disclose a composition for use with a printing plate comprised of an alkali developer-insoluble complex, made up from a phenolic resin and quinoline, benzothiazole, pyridine and imidazoline. When this complex is exposed to infrared radiation, its solubility changes because of the heat absorbed, the non-exposed area remaining unaffected. The agents making insoluble the polymer mentioned in that patent are dyes which formulae are described therein.

PCT/GB95/02774 is another example of imaging from a composition for positive plates containing naphtoquinone diazide ester and a phenolic resin. In the method described therein, the photo-sensitive composition is firstly uniformly exposed to ultraviolet radiation in order to make the composition soluble in an alkali developer. The plate is placed on a device where it receives infrared radiation so as to image and changes the composition solubility on those areas. The areas not exposed to radiation are then removed by the developing alkali solution.

In addition, the PCT/BR02/00075 (WO02/096649 of the own applicant, also discloses compositions and structures for radiation sensitive plates.

SUMMARY OF THE INVENTION

It is an object of the present invention to provide new positive working thermal imaging assembly or structure, especially suitable as lithographic printing plates, color proofing films and photoresists produced with aluminum or polyester substrates.

It is another object of the present invention the products manufactured with the use of the positive working thermal imaging assembly of the present invention.

Another object of the present invention relates to a process for manufacturing offset aluminum or polyester lithographic printing plates, color proofing films, photoresist and related products using the new positive working thermal imaging assembly or structure of the present invention.

It still refers to the use of said positive working thermal imaging assembly or structure for preparing the products mentioned herein. Additional embodiments of the invention are represented by a bilayer product, bilayer coating per se and the system itself comprising the suitable components so as to provide the radiation sensitive treated layers onto a substrate.

DETAILED DESCRIPTION OF THE INVENTION

The invention refers to Positive working thermal imaging assembly used as graphic arts materials such as lithographic printing plates, films and proofing materials. The positive working thermal imaging assembly of the invention comprises:

A—a substrate; and
B—a thermally sensitive imaging element of a composite layer structure comprising a first layer on the substrate of a polymeric material soluble in aqueous alkali solution, optionally containing compounds that absorb and convert light to heat and/or a coloured dye or pigment;

said first layer being converted at its surface by treatment with solutions at elevated temperatures that contain an active compound or compounds capable of rendering said first polymeric material less soluble in an aqueous alkali developer at the point of contact; the first layer being oleophilic.

optionally, a first intermediate layer between the substrate and the said first layer with a second polymeric material which is soluble or dispersible in aqueous solution optionally containing compounds that absorb and convert light or radiation to heat and/or a coloured dye or pigment coated from a solvent that does not substantially dissolve the first layer.

Optionally, a third or top layer over the converted first layer and composed of a second polymeric material which is soluble or dispersible in aqueous solution optionally containing compounds that absorb and convert light or radiation to heat and/or a visible coloured dye or pigment; the first intermediate layer and the third layer being applied with a solvent that does not substantially dissolve the converted first layer.

The substrate A is particularly aluminum or polyester which are the substrates usually employed in lithographic printing plates, for color proofing films and photoresist materials.

The positive working thermal imaging assembly of the present invention contains basically a first layer having its upper surface duly treated with a compound or compounds capable of rendering said first polymeric material less soluble in an aqueous alkali developer. The first layer is usually a soluble alkali phenolic resin such as novolak as the binding polymer; optionally containing compounds that absorb and convert light to heat and/or a coloured dye or pigment.

The first layer is applied to the substrate and thereafter it is treated with solutions at elevated temperatures that contain an active compound or compounds capable of rendering said first polymeric material less soluble in an aqueous alkali developer at the point of contact. The alkali-soluble polymer of the first layer is rendered less alkali soluble by the application of the active compound or compounds which are usually applied in a non-solvent for the first layer, for example, using toluene.

The Image-wise exposure of the whole assembly resulted in an increase in alkali-developer solubility where the incident radiation had been absorbed relative to the alkali-insolubility of the unexposed regions. Application of an appropriate alkali developer dissolved the exposed regions leaving the unexposed regions intact to create a positive image. When the assembly is applied to a hydrophilic support the exposed and developed plate can be suitably an efficiently employed as a printing plate, films and proofing materials.

The coating itself is not significantly affected by UV radiation. Prior to the treatment, both the first layer and the active compound or compounds, in isolation or individually, are soluble in alkali but together they become less soluble. The first layer having its surface treated with the active compound/compounds, forms a Thermally Imageable Element (TIE). The formation of such TIE element composed by the first layer and a very thin layer resulting from the treatment with the active compound/compounds is a critical and essential feature of the invention. In isolation neither layer is imageable by image-wise exposure to infra-red radiation.

The weight of the thin layer formed from the treatment with the active compound over the first layer is very low (preferably 10–100 mg/m$^2$) which means its dry film thickness is likely to be between 0.1 to 0.005µ (microns). The coating from solvents and drying to a solvent-free or low solvent-content film is standard practice in the manufacture of graphic arts materials such as lithographic printing plates, film and proofing materials. However, the controlled application of such thin films as 0.1 to 0.005µ (microns.) over such large surface areas (thousands of square meters.) requires expensive specialist equipment and skillful process control.

The treatment of the surface of the first layer after application on the substrate is critical for successful imaging and developing according to the invention. The application of alkali, normal positive developers in practice, to an area of low or no coverage by the active compound(s) will result in discontinuity of the TIE rendering it useless in application due to developer attack.

The treatment of the first surface is preferably performed by immersing the substrate coated with the first layer coating into a solution at elevated temperature. Thereafter, the structure (substrate/first layer treated with the active compound(s)) thus treated is subjected to rinsing in the immersion solvent and drying. The use of immersion techniques for the treatment with the active compound(s) is preferred over other alternative coating process since it furnishes some advantages as for example:

- the immersion equipment is extremely inexpensive and easy to control compared to other coating techniques;
- the possibility for areas of no or low levels of Surface Conversion Treatment (coating as merely a technique to affect a change of a conversion process at the surface of the first layer rendering it less alkali soluble) are much reduced thus reducing the chance of failure in the field and yield loss in manufacture;
- the possibility of over treating the surface is also reduced because excess reagent is washed off after the appropriate treatment time. This will show as reduced variability as excess reagent can be unpredictably absorbed over time dependent on environmental conditions; and
- by carrying out an immersion process to effect this change, an entire in-line coating process which would be used is released from the manufacturing line which may be used to further enhance the overall properties and performance of the assembly.

Although the treatment of the surface of the first layer is preferably performed by immersing techniques, the treatment can also be performed by using coating rolls in which the active compound/compounds are applied on the first layer in the substrate.

When using the immersion process, the in-line conventional coating devices which would no longer be used for treating the first layer, for example, the No Pre-Heat positive thermal plates are renowned for a susceptibility to scratching, scuffing and marking created by general handling and especially by the automatic loading devices where rollers and suction cups create surface damage. The additional coating device could be used to apply a further coating which acts to protect the TIE from scratching and marking. An example is a 'methacryloxy-functional silicone polyether copolymer' supplied by Dow Corning under the product name '31 Additive' which has a low coefficient of friction or a silicone glycol copolymer product known as '11 additive' from the same company.

As previously mentioned, according to an embodiment of the invention, it is also possible to incorporate the visible dye in the additional layers or optional layers and not using it in the first layer. Typical visible dyes used in the art are triarylmethane dyes [such as Crystal Violet, Victoria Blue] as they are bright and soluble in typical coating solvents. When incorporated into a phenolic resin based coating they could possibly act as solubility inhibitors to the resin i.e. they would reduce the alkali-developer solubility. The 'complex' formed that is responsible for this affect can be reversibly broken down by heat. There are two disadvantages to this type of system. The nature and strength of the complex changes over time and with ambient conditions. The amount of energy (for example from a thermal laser) required to break down the complex [and create a change in alkali developer solubility thereby forming an image after development in alkali developer] is proportional to the strength of the complex. This means that the optimum exposure energy will change over time possibly limiting the usefulness of a derived product. Therefore, one advantage is that by removing the visible dye from the resin layer the coating can be rendered more stable over time.

Secondly, since the energy required is proportional to the strength of the complex which is proportional to the amount of solubility inhibitor the photographic speed of the coating is limited since increasing the inhibitor level increase alkali developer resistance but will increase the amount of energy required to image i.e. the coating is photographically slower. On the other hand, if we reduce the inhibitor level we reduce the energy required to break down the complex but resistance to alkali developer reduces to a point of uselessness in application. Therefore, one advantage of not using the dye in the first resin layer is that it breaks the 'photographic speed/alkali developer resistance' constraint and allows a faster assembly to be formulated without compromise to alkali developer resistance.

After infrared exposure, the energy absorbed by the infrared-absorbing dye is transferred as heat and destroys the phenolic resin protection, allowing dissolution thereof in an alkali solution.

The positive working thermal imaging assembly of the present invention has many advantages as compared to the conventional printing plates made from other compositions. One of the advantages of the present invention is that preheating of the binding polymer system so to image prior to development is not required. Another advantage of this invention is that pre-exposure to ultraviolet radiation prior to infrared image is not needed. Still another advantage of this invention is that low concentration of infrared sensitive dye is used since the treatment of the first layer interacts with and protects and renders the resin of the first layer less soluble, allowing development thereof in high pH developers, about 14, of the kind used for conventional positive plates (PD2 IBE developer), after exposure. An additional advantage is that the positive working thermal imaging assembly containing the Thermally Imageable Element (TIE) of the present invention may be processed in different radiating devices, at wavelengths such as from 830 nm to 1064 nm. Still another advantage is that the coating compositions of the present invention do not emit particles or vapors (ablation), avoiding the formation of precipitates on the infrared-emitting devices and the evolution of harmful vapors to the environment during exposure.

Apart from these aspects, several other advantages are involved when the preferred treatment technique (immersion) is used for the treatment of the first layer as disclosed above.

The positive working thermal imaging assembly of the invention can, optionally, comprises a first intermediate layer between the substrate and the first layer with a second polymeric material which is soluble or dispersible in aqueous solution optionally containing compounds that absorb and convert light or radiation to heat and/or a coloured dye or pigment coated from a solvent that does not substantially dissolve the first layer.

In addition, it may optionally contains a third or top layer over the converted first layer (over the TIE structure) and composed of a second polymeric material which is soluble or dispersible in aqueous solution optionally containing compounds that absorb and convert light or radiation to heat and/or a visible coloured dye or pigment; the first intermediate layer and the third layer being applied with a solvent that does not substantially dissolve the converted first layer.

The second Dolymeric material of the first intermediate layer and the third or top layer can be polyvinyl alcohol, polyvinylpyrrolidone, polyvinylmethyl ether or polyvinylethyl ether.

Several combinations of components (for example IR absorber and dyes and pigments) can be used according to the invention. For example, the optional intermediate and third layers can be mutually exclusive regarding IR absorbing/converting compounds and visible coloured dye or pigment. In addition, the first intermediate layer or third layer may contain both IR absorbing/converting compounds-and visible dyes and, by using this combination, the other layers (TIE) is absent from them. Another possibility is to use both the IR absorbing compounds and visible dyes in the first layer on the substrate, whereby these components would be absent from the intermediate and third layers.

The first layer is applied to the substrate and thereafter the upper surface of the first layer (surface not contacting the substrate) is treated by contact with a solution of a compound that renders the surface of said second layer insoluble to aqueous alkaline developer. The treatment is preferably by immersion for 1 to 120 seconds at a temperature of 50 to 120° C. More particularly, the contact process is for 10 to 90 seconds at a temperature of 60 to 100° C. and most preferably for 20 to 60 seconds at a temperature of 70 to 90° C.

Particularly, the contact process is carried out by using a solution containing a non-solvent for the first layer. Preferably it is performed by using toluene or water.

The active compound used for the treatment of the first layer is in a solution containing 0.001 and 0.25 weight % thereof, preferably 0.005 and 0.10 weight % thereof and most preferably 0.01 and 0.075 weight % thereof.

Other polymers can be associated to the binding polymer of the first layer, increasing both the abrasion resistance of the layer and the acceptability of the positive working thermal imaging assembly and products made with the same so as to improve plate performance during the printing process. In particular, compositions employed for coating the imaging assembly of the present invention are not limited to the use of only one resin as the binding polymer; they are sensitive to radiation in the range from 700 to 1200 nm of the radiation spectrum and can be manipulated in the visible region; they can be used in commercially available infrared image setters and with different wavelengths; and they employ developers for conventional positive plates. Therefore, the radiation sensitive assembly of the present invention provides a wide range of processing (e.g., temperature, dip time etc.) and a high degree of adequacy of the printing plates to the printer real needs.

The positive working thermal imaging assembly of the invention provides printing plates containing the compositions of the present invention exhibit a large number of prints in the printing process, about 100,000 copies in regular processing and over 600,000 copies if they are subject to heat (cure).

The term "The positive working thermal imaging assembly" as used herein encompasses not only the combination of layer(s) with the substrate as defined herein but also any related product manufactured from the corresponding structure disclosed herein.

The new positive working thermal imaging assembly of the present invention essentially comprises a first layer duly treated as disclosed herein on an aluminum surface (most preferred substrate), as known to one skilled in the art of forming a substrate for a printing plate, the first layer being applied onto the substrate and thereafter the upper surface of the first layer is treated with the active compound. The treated structure is then rinsed and dried.

If the substrate is a polyester support, it may be used as a color proofing film or for printing.

When used as a printing plate, the assembly is sensitive to energy in the infrared region and is not sensitive in the visible region of the spectrum. Depending on the infrared absorber selected, a composition may be made to respond in the region between 700 and 1200 nm.

The layers of the positive working thermal imaging assembly of the present invention may contain one or more infrared-absorbing dye, even of different wavelengths. A printing plate containing infrared absorbers of different wavelengths has the advantage of making possible the use thereof in different commercially available devices for receiving radiation and imaging. Presently, two wavelengths are used. An array of laser diodes emitting at 830 nm is commercially available, which is manufactured and sold by Creo, Vancouver, Canada. The other is the YAG laser outputting at the range of 1064 nm also in the market, which is manufactured and sold by Gerber, a Barco division, Gent, Belgium. Each wavelength has its advantages and disadvantages and both are able to generate acceptable images according to the specific manufacturing mode. Digital information is then used for modulating the laser output. Energy is directed to the printing plate surface where energy absorption by an infrared-absorbing dye occurs, then it is transferred as heat, changing solubility at the interface between the two layers, the binding polymer then becoming unprotected and developer-soluble. That portion of the coating which is struck by energy is removed in the developing process while the non-radiated area remains insoluble as the imaging area. This process is known as "Write-the-non-image area".

The positive working thermal imaging assembly can be developed using a developing composition, which is aqueous and alkaline. Developers typically used for positive printing plates may be employed in the present invention. Developer takes advantage from the differentiation created with the radiation exposure, to remove the coating from the non-image area and allow the image area to remain. At this point, the plate is able of performance on the printing machines, and may print 100,000 copies. If necessary, such performance may be enhanced by subjecting the coating to heat cure. The step of full cure completes the polymers cross-linking resulting in an image able to provide over 600,000 copies. The curing time usually employed is in the range of 1 to 10 minutes and the temperature is from 180 to 260° C. Curing is usually carried out with conveyor oven such as those sold by Wisconsin Oven.

As described above, the components necessary to furnish a product sensitive to radiation in the range from 700 and 1200 nm forms a Thermally Imageable Element (TIE), essentially composed of a first layer containing a binding polymer and one thin layer. The thin layer is formed over the first layer when the active compound is applied over the same which comprises one or more polymeric active compounds which interact and adhere to the binding polymer of the first layer, making it less soluble in the developer for conventional positive plates.

The binding polymer is a condensation product of phenol, ortho-chlorophenol, o-, m- or p-cresol, p-hydroxy benzoic acid, 2 naphthol or other aromatic monohydroxy monomer with an aldehyde such as formaldehyde, acetaldehyde, fural, benzaldehyde, or any other aliphatic or aromatic aldehyde. This polymer is preferred to have a molecular weight in the range from 2,000 to 80,000, more preferably in the range of 4,000 to 40,000 and most preferably in the range of 7,000 to 20,000. The binding polymer of the first layer is preferably phenolic resin, polyvinylphenol or mixture thereof, most particularly a novolac resin.

The binding phenolic polymer is preferably used in the range from about 85% to about 99%, more preferably in the range from about 90% to about 95%, based on the total solids in the composition used to form the first layer.

In case a higher number of copies is needed, other polymers can be optionally added to the system above, such as the condensation polymer of methylated melamine formaldehyde—Resimene 735 manufactured by Monsanto, polymer of butylated urea formaldehyde—Cymel U216–8— manufactured by Cytec Industries, copolymer of vinyl pirridone/vinyl acetate—Luviskol Va.—manufactured by BASF Fine Chemicals. These polymers can be added in the ratio of 0,5 to 20% based on the total weight of the binding polymer, preferably from 2.0 to 10%.

The infrared absorber may be one or more dye or insoluble material such as carbon black. Preferred dyes are those from the classes including, but not limited to, pyridyl, quinolinyl, benzoxazolyl, thiazolyl, benzothiazolyl, oxazolyl and selenazolyl. Carbon black is useful in that it is a panchromatic absorber and works well with energy sources in the full infrared spectrum used for the application of imaging coating films and it is inexpensive and readily available. This region begins in the near infrared (nir) at 700 nm and goes up to 1200 nm. The disadvantage of the carbon black is that it is unable to participate in an image differentiation. In contrast, dyes are just appearing as commercial products and are very expensive. They must be carefully selected so that the maximum absorption ($\lambda$max) closely matches the output wavelength of the laser used in the image setter. Dyes will advantageously improve differentiation between image and non-image areas created when laser images in the medium being employed.

The infrared-absorbing medium is preferably used in the composition in the range of 0,5% to 10% by weight based on the total weight of solids in the composition. More preferably it ranges from about 2.0% to about 5.0%.

It can be desirable to add a dye to the layers. The purpose of using dyes in the layers is to distinguish an image area after development and increasing the layer oleophily thus enabling a higher amount of printing paint to be received. The amount of dye to be added ranges from 0.5 to 3.0% by weight based on the total weight of solids in the composition. Dyes which may be employed are Malachita green, methylene blue, Victoria Blue, Crystal Violet and Rhodamine B. Other types of dyes that can be used are Orasol Blue, Orasol Red and Orasol Violet, manufactured by Ciba-Geigy.

The composition to form the first layer is dissolved in a suitable solvent (or suitable solvents). Examples of such solvents include, but are not limited to: 1-methoxy-2-ethanol, 1-methoxy-2-propanol, acetone, methyl ethyl ketone, diisobutyl ketone, methyl isobutyl ketone, n-propanol, isopropanol, tetrahydrofuran, butyrolactone and methyl lactate.

The active compound for the treatment of the first layer of the binding polymer, making it developer-resistant, may be one or more polymers including polymeric amines, polyacetals (polyvinyl butyral, polyvinyl formal etc.);, polyethylene glycol, butylated urea formaldehyde, copolymers of vinyl pirrolidone and vinyl acetate, methylated melamine formaldehyde, cellulose esters, or mixtures thereof. This second layer is preferably dissolved in solvents not dissolving the binding polymer of the first layer, which form a film evenly adhered to the first layer, and which are readily evaporated, such as in methylene chloride, toluene and xylene. The dry coating weight must range between 5 and 200 mg/m$^2$, preferably 10–100 mg/m$^2$. The following commercially available polymers may be mentioned:

Polymeric amines—Solsperse, manufactured by Avecia Pigments and Additives;

Polyvinyl butyral—Mowital B30 H, manufactured by Hoescht Celanese;

Polyethylene glycol—Carbowax, manufactured by Union Carbide;

Cellulose butyrate/acetate and cellulose propionate acetate —Eastman Chemical;

Butylated urea formaldehyde—Cymel U216-8— manufactured by Cytec Industries;

Methylated melamine formaldehyde—Resimene 735 manufactured by Monsanto;

Triton X100;
CAB-551-0.1; and
Monazoloine C.

If desired, surfactants may be added to the compositions so as to obtain characteristics required by positive working thermal imaging assembly. Surfactants are employed in order to enhance the coating application to aluminum or polyester supports. Surfactants to be employed include fluorocarbonated surfactants such as FC-430 by 3M Corporation or Zonyl Ns by DuPont, block polymers of ethylene oxide and propylene oxide known as Pluronic and manufactured by Basf and silicone surfactants such as BYK 307 manufactured by BYK Chemie. These surfactants improve the composition cosmetics during application thereof to the substrate, avoiding imperfections and the appearance of voids on the layer. The amount of surfactant employed ranges from 0.01 to 0.5% by weight base on the total weight of solids in the composition.

The coating components may be added at several solids levels depending on the technique used to apply the coating to the substrate being coated. Therefore, the ratios of components may be the same, but percentages can differ. The disclosure of the percentage ranges of the components as that of the solution is not significant. As an example, some amounts of each coating component will be cited herein as a percentage of total solids. The coating components are dissolved in a desired solvent system. The solution of the first coating layer is applied to the selected substrate. The coating is applied such as to have a dry coating weight in the range from about 0.5 g/m2 to about 2.0 g/m2. More preferably, from about 0.8 g/m2 to about 1.4 g/m2 is used. The coating is dried under conditions which will effectively remove all solvent therein, but not so harmful to cause degradation of the polymers with themselves or with others. Then, the second coating layer is applied so as to have a dry coating weight from 5 to 200 mg/m$^2$, preferably from 10 to 100 mg/m$^2$.

The following examples illustrate the invention but do not limit the same at all.

EXAMPLE 1

A coating solution was prepared by dissolving 8.0 g Bakelite 6564 (a novolak resin sold by Bakelite), 0.25 g laser dye 830 A (manufactured by Siber Hegner, Zurich, Switzerland), 0.02 g Zonyl Ns (manufactured by DuPont) and 0.20 g Orasol Violet (manufactured by Ciba Geigy) in 58 g 1-methoxy-2-propanol and 19 g methyl ethyl ketone. An aluminum substrate which has been previously degreased, electrochemically grained, anodized and made hydrophilic with a polyvinyl phosphonic acid treatment, as is well-known to one skilled in the art, was coated with the above composition. After properly dried, a toluene solution of 2% CAB-551-0.1 (manufactured by Eastman Chemical) was applied onto the plate and dried forming a 50 mg/m$^2$ film.

The plate was placed on a Creo Trendsetter image setter and imaging is carried out in the "write-the-non-image-area" mode using 120 mJ/cm2 energy density at 830 nm. After exposure, the areas exposed to radiation were observed not to have suffered ablation. The plate was developed through a processing machine charged with positive developer IBF-PD2. The developed plate was observed to have a good resolution positive image. Based on a UGRA scale, halftone dot resolution was 2.0–98%. Under standard printing conditions, the plate was observed to print about 80,000 good copies.

EXAMPLE 2

Another plate was prepared as described in example 1 except that after imaging and development the plate was protected with an IBF oven solution and subjected to a heat curing treatment over 5 minutes at 230° C. The plate was washed for removing the oven solution, dried and placed in a printing machine. Under standard printing conditions, the plate was observed to print about 600,000 good copies.

EXAMPLE 3

A coating solution was prepared by dissolving 9.6 g HRJ 2606 (a novolak resin sold by Schenectady), 0.34 g laser dye 830 A (manufactured by Siber Hegner, Zurich, Switzerland), 1.2 g Cymel U216-8 (manufactured by Cytec), 0.02 g Fluorad FC-430 (manufactured by 3M), and 0.12 g flexo blue (a dye manufactured by BASF Corporation) in 81.6 g 1-methoxy-2-propanol and 20 g methyl ethyl ketone. An aluminum substrate which has been previously degreased, electrochemically grained, anodized and made hydrophilic with a polyvinyl phosphonic acid treatment, as is well-known to one skilled in the art, was coated with the above composition. After properly dried, a solution containing 1,5% Solsperse 20.000 (a polymeric amine manufactured by AVECIA Pigments and Additives USA) was applied onto the plate, dried forming a 75 mg/m2 film, and placed on a Creo Trendsetter image setter. Imaging is carried out in the "write-the-non-image-area" mode adjusting the energy density to 120 mJ/cm2 at 830 nm. After exposure, the areas exposed to radiation were observed not to have suffered ablation.

The plate was developed through a processing machine charged with positive developer IBF-PD2. Positive image resolution was very good. Based on a UGRA scale, halftone dot resolution was 2.0–98%. Under standard printing conditions, the plate was observed to print about 150,000 good copies.

EXAMPLE 4

A coating solution was prepared by dissolving 8.6 g Bakelite 744 (a novolak resin sold by Bakelite), 0.80 g Luviskol VA 64 (manufactured by BASF Fine Chemical), 0.27 g laser dye 830 A (manufactured by Siber Hegner, Zurich, Switzerland), 0.015 g of a mixture of 1:2 Fluorad FC 430 and BYK 370 (manufactured by BYK Chemie), and 0.15 g Malachita Green in 81.6 g 1-methoxy-2-propanol and 20 g methyl ethyl ketone. An aluminum substrate which has been previously degreased, electrochemically grained, anodized and made hydrophilic with a polyvinyl phosphonic acid treatment, as is well-known to one skilled in the art, was coated with the above composition. After properly dried, a xylene solution of 2.0% Carbowax 2000 (Union Carbide) was applied onto the plate which, after it is dried, forms an about 70 mg/m2 film. Then, the plate is placed on a heat image setter at 830 nm with energy density adjusted to 120 mJ/cm2, in the "write-the-non-image-area" mode. After exposure, the areas exposed to radiation were observed not to have suffered ablation. The plate was developed through an automatic processing machine charged with positive developer IBF-PD2, and the positive image formed was observed to belong to the area not exposed to radiation. Image resolution was very good and based on a UGRA scale, halftone dot resolution was 2.0–98%. Under standard printing conditions, the plate was observed to print about 80,000 good copies.

EXAMPLE 5

A coating solution was prepared by dissolving 12.0 g HRJ 2606 (a novolak resin sold by Schenectady), 0.17 g laser dye ADS 830 A (sold by ADS American Dye Source, Inc.), 0.04 g Pluronic PE 4300 (manufactured by Basf) and 0.10 g Malachita green in 81.6 g 1-methoxy-2-propanol and 20 g methyl ethyl ketone. An aluminum substrate which has been previously degreased, electrochemically grained, anodized and made hydrophilic with a polyvinyl phosphonic acid treatment, as is well-known to one skilled in the art, was coated with the above composition. After properly dried, a 2% Cymel U 216-Y solution was coated onto the plate which, after it is dried, formed a 50 mg/m2 film. The plate is placed on a Creo Trendsetter image setter and imaging is carried out in the "write-the-non-image-area" mode adjusting the energy density to 120 mJ/cm2 at 830 nm. After exposure, the areas exposed to radiation were observed not to have suffered ablation. The plate was developed through a processing machine charged with positive developer IBF-PD2. The developed plate was observed to have a strong positive image with good resolution. Based on a UGRA scale, halftone dot resolution was 2.0–98%. Under standard printing conditions, the plate was observed to print about 120,000 good copies.

EXAMPLE 6

A coating solution was prepared by dissolving 4.6 g Bakelite 744 (a novolak resin sold by Bakelite), 5.0 g HRJ 2606 (a novolak resin sold by Schenectady), 0.26 g laser dye ADS 1064 (sold by ADS American Dye Source), 0.15 g Malachita green, and 0.85 g Resimene 735 (manufactured by Monsanto) in 81.6 g 1-methoxy-2-propanol and 20 g methyl ethyl ketone. An aluminum substrate which has been previously degreased, electrochemically grained, anodized and made hydrophilic with a polyvinyl phosphonic acid treatment, as is well-known to one skilled in the art, was coated with the above composition.

After properly dried, a toluene solution of 1% CAB 551-0.1 and 1% Solsperse 27000 (manufactured by AVECIA Pigments and Additives USA) was applied onto the plate, forming a 55 mg/m2 film. The plate was placed on a heat image setter, Gerber Crescent 42T, with laser YAG at a wavelength about 1064 nm. Imaging is carried out in the "write-the-non-image-area" mode, adjusting the energy density to 100 mJ/cm2. After exposure, the areas exposed to radiation were observed not to have suffered ablation. The plate was developed through an automatic processing machine charged with positive developer IBF-PD2, and the positive image formed exhibits a good resolution. Based on a UGRA scale, halftone dot resolution was 2.0—98%. Under standard printing conditions, the plate was observed to print about 130,000 good copies.

EXAMPLE 7

A coating solution was prepared by dissolving 8.6 g Bakelite 6564 (a novolak resin sold by Bakelite), 0.19 g dye 1064 (sold by Epolin N.J. USA), 0.20 g laser dye 830 A (manufactured by Siber Hegner, Zurich, Switzerland), 0.12 g triphenyl phosphate and 0.15 g Malachita Green in 81.6 g 1-methoxy-2-propanol and 20 g methyl ethyl ketone. An aluminum substrate which has been previously degreased, electrochemically grained, anodized and made hydrophilic with a polyvinyl phosphonic acid treatment, as is well-known to one skilled in the art, was coated with the above composition. After properly dried, a xylene solution of 2.0% Carbowax 2000 (Union Carbide) was applied onto the plate which, after dried, formed an about 75 mg/m2 coating. Then, the plate was placed on a heat image setter at 830 nm, with the energy density adjusted to 120 mJ/cm2 in the "write-the-non-image-area" mode. After exposure, the areas exposed to radiation were observed not to have suffered ablation. The plate was developed through an automatic processing machine charged with positive developer IBF-PD2. Positive image resolution was very good and based on a UGRA scale, halftone dot resolution was 2.0—98%. Under standard printing conditions, the plate was observed to print about 80,000 good copies.

EXAMPLE 8

A plate was prepared as described in example 7 and placed on a heat image setter Gerber Crescent 42 T with the energy density adjusted to 100 mJ/m2 at 1064 nm in the "write-the-non-image-area" mode. After exposure, the areas exposed to radiation were observed not to have suffered ablation. The plate was developed through an automatic processing machine charged with positive developer IBF-PD2. Image resolution based on a UGRA scale was about 2 to 98% and the plate printed about 80,000 good copies.

EXAMPLE 9

This example shows the possibility of treating by immersion technique the aluminium substrate coated with the first layer of the invention. The active compound Solsperse was applied by immersion onto a substrate coated with novolac. The assembly was thereafter rinsed and dried.

9.1. Using a standard first layer of novolac and Solsperse 20,000 as the active agent in toluene, the time/temperature/concentration conditions were varied to find a process window that gives good results. All plates used were standard first coated product and were exposed on an Optronics Aurora thermal platesetter at 150 mJcm2 with a target 50% image pattern. The summary of the variations are listed below:

| | 70 | | 80 | | 90 | | Temp/° C. |
|---|---|---|---|---|---|---|---|
| Conc./% | 30 | 60 | 30 | 60 | 30 | 60 | Time/s |
| 0.05 | ✓ | X | ✓ | X | X | X | |
| 0.025 | ✓ | ✓ | ✓ | X | | | |

Roughly assessing the appearance of the derived un-inked 50% screen image, the preferred process conditions appear to be Soisperse at 0.025% at a temperature of 70–75° C.

9.2. To fine tune this process a test was done at 75° C. with Soisperse at 0.025% with immersion times in 10 second intervals on the same plate. This showed the following results as measured by ccDot densitometer suggesting a large 30 second process window between 20 and 50 seconds.

| | Time/s | | | | |
|---|---|---|---|---|---|
| | 10 | 20 | 30 | 40 | 50 |
| Density/% | 39 | 49 | 49 | 49 | 48–49 |
| Inked Density/% | 38–40 | 49 | 49 | 48–50 | 48–50 |

9.3. In order to improve the flexibility and safety hazard of the process to determine if a non flammable solvent could be used, test 9.2 was repeated by substituting water in place of toluene and achieved the following results.

|  | Time/s | | | | |
| --- | --- | --- | --- | --- | --- |
|  | 20 | 30 | 40 | 50 | 60 |
| Density/% | 37 | 38.75 | 40 | 41 | 44 |

The process is slower in water than in toluene at this concentration.

EXAMPLE 10

10.1. Using a standard first layer as in example 9 and 0.05% Solsperse 27,000 as the active agent in water (it is soluble in water) at 7500, the immersion time was varied from 20 to 60 seconds. Image attack was apparent on the 60 second immersion time sample prior to exposure. All plates were exposed on an Optronics Aurora thermal platesetter at 150 mJ/cm$^2$ with a target 50% image pattern. All immersion times appeared to result in over-treatment although partial images of the target screen were visible. This was repeated using Solsperse 27,000 at 0.0125% concentrations and again shows this is faster even at low concentrations and less controllable as a process.

|  | Temperature = 75° C. | | | | | | | | | | |
| --- | --- | --- | --- | --- | --- | --- | --- | --- | --- | --- | --- |
|  | Time/2 | 20 | 30 | 40 | 50 | 60 | Time/s | 5 | 10 | 15 | 20 | 30 |
| Solsperse 27,000 conc./% in water | 0.05 | X | X | X | X | Attack | 0.0125 | 41 | 43 | 45 | 41* | 43* |

*Separate experiment 10.2. Experiment 10.1 was repeated using 0.025% Solsperse 27,000 in toluene and immersion times of 20 to 60 seconds. Images were clear on all but the 60 second example but only the 20 second example developed cleanly to leave an excellent image. The Solsperse 27,000 15 concentration was reduced to 0.0125% and the experiment repeated to give the following results.

|  |  | Temperature = 75° C. | | | | |
| --- | --- | --- | --- | --- | --- | --- |
|  | Time/s | 20 | 30 | 40 | 50 | 60 |
| Solsperse 27,000 conc./% in toluene | 0.05 | — | — | — | — | — |
|  | 0.025 | ✓ | X | X | X | X |
|  | 0.0125 | 35% | 49% | 53.5% | X | X |

By the results, Solsperse 27,000 has a much stronger affect than Solsperse 20,000 since 10 second changes in immersion time produce dramatic effects, whereas Solsperse 20,000 is unresponsive in dot density over a broad range.

EXAMPLE 11

This example shows the use of different active components for treating (by immersion) the substrate coated with the first layer of novolac.

a) 0.025 weight % Carbowax 2000 in Toluene at 7500 for 40 seconds. First the coated product was immersed for 10/20/30/40/50/60 seconds, rinsed in toluene and dried. Imaged at 15OmJcm$^2$ with a 50% screen, developed and inked half of the sample. Dot densities (ccDot) for inked and un-inked portions were measured and recorded.

b) Repeat as for a) substituting Monazoline C in place of Carbowax.

c) Repeat as for a) substituting CAB-551-0.1 in place of Carbowax.

d) Repeat as for a) substituting Triton X100 in place of Carbowax.

The summary of the conditions and results are listed in the tables indicated below.

|  |  | Conc/wt. % | | Dot Density | |
| --- | --- | --- | --- | --- | --- |
|  | Temp/° C. | (Toluene) | Time/s | Un-inked | Inked |
| Carbowax 2000 | 75 | 0.025 | 20 | 41 | 41.5 |
|  |  |  | 30 | 51 | 51 |
| CAB-551 | 75 | 0.025 | 30 | 37.5 | 37 |
|  |  |  | 40 | 44.5 | 45 |
| Triton X100 | 75 | 0.025 | 20 | 38.5 | 37.5 |
|  |  |  | 30 | 44.5 | 43.5 |
| Monazoline C | 75 | 0.1 | 40 | 37.5 | 37.5 |
|  |  |  | 50 | 40 | 40 |

The above results show the possibility of using variations related to the active compounds for the treatment of the first layer as disclosed herein.

EXAMPLE 12

This example shows the use of Polyvinylphenol resin as the polymer for the first layer on an aluminum substrate. The conditions were the preferred process conditions used for the previous examples related to novolac in the first layer. Solsperse was then applied by immersion as in the previous examples. The effectiveness of Soisperse as the active component in toluene was evaluated to change the dissolution behaviour of the materials. The make up was a first coating comprising a high molecular weight Polyvinylphenol (Marukar Lyncur, CBA [styrene:butylmethacrylate copolymer] from Japan) in place of current resin system but containing current IR and visible dyes. It was treated with Solsperse 20,000 in Toluene at 75° C. for 40 seconds, rinsed in Toluene, dried, imaged and developed. Half of the sample was inked and the dot densities of inked and un-inked images were recorded. The results were satisfactory and further illustrates this embodiment of the invention.

FIG. 1 attached illustrates a structure of the invention, in which the bottom is the substrate; layer 1 is the optional intermediate layer; layer 2 means the first layer of binding polymer; T means the thin layer formed by the treatment with the active component and 3 means the optional third layer.

The invention claimed is:

1. A positive working thermal imaging assembly comprising
   A—a substrate; and
   B—a thermally sensitive imaging element of a composite layer structure comprising
   a first layer on the substrate of a novolac resin soluble in an aqueous alkali solution, optionally containing a compound that absorbs and converts light to heat and/or a colored dye or pigment;
   said first layer being converted on a surface thereof by treatment with a solution at an elevated temperature that contains an active compound capable of rendering said novolac resin less soluble in an aqueous alkali developer at the point of contact; the first layer being oleophilic, wherein the first layer is treated by contact with said solution for 1 to 120 seconds at a temperature of from 50 to 120° C., and wherein said active compound is a polymeric amine;
   optionally, a first intermediate layer between the substrate and the first layer of a polymeric material which is soluble or dispersible in an aqueous solution and that optionally contains a compound that absorbs and converts light or radiation to heat and/or a colored dye or pigment coated from a solvent that does not substantially dissolve the first layer; and
   optionally, a third or top layer over the converted first layer and composed of a polymeric material which is soluble or dispersible in an aqueous solution and that optionally contains a compound that absorbs and converts light or radiation to heat and/or a colored dye or pigment; the first intermediate layer and the third layer being applied with a solvent that does not substantially dissolve the converted first layer.

2. The positive working thermal imaging assembly according to claim 1, wherein the first intermediate layer and the third layer are present and are mutually exclusive with respect to a compound that absorbs and converts light or radiation to heat and a colored dye or pigment.

3. The positive working thermal imaging assembly according to claim 1, wherein one of either the first intermediate layer or the third layer is present and contains both a compound that absorbs and converts light or radiation to heat and a colored dye or pigment and the other layer is absent from the assembly.

4. The positive working thermal imaging assembly according to claim 1, wherein the first layer contains both a compound that absorbs and converts light or radiation to heat and a colored dye or pigment and they are absent from the intermediate and third layers.

5. The positive working thermal imaging assembly according to claim 1, wherein the contact process is from 10 to 90 seconds at a temperature of from 60 to 100° C.

6. The positive working thermal imaging assembly according to claim 6, wherein the contact process is from 20 to 60 seconds at temperature of from 70 to 90° C.

7. The positive working thermal imaging assembly according to claim 1, wherein the contact process is carried out by using a solution containing a non-solvent for the first layer.

8. The positive working thermal imaging assembly according to claim 7, wherein the contact process is carried out using toluene or water.

9. The positive working thermal imaging assembly according to claim 1, wherein the active compound is in a solution containing from 0.001 and 0.25 weight % thereof.

10. The positive working thermal imaging assembly according to claim 9, wherein the active compound is in a solution containing from 0.005 and 0.10 weight % thereof.

11. The positive working thermal imaging assembly according to claim 9, wherein the active compound is in a solution containing from 0.01 and 0.075 weight % thereof.

12. The positive working thermal imaging assembly according to claim 1, wherein the compound that absorbs and converts light or radiation to heat is a pigment or dye that absorbs radiation between the wavelengths of 700 and 1200 nm.

13. The positive working thermal imaging assembly according to claim 12, wherein the compound is a pigment and is milori blue or carbon black.

14. The positive working thermal imaging assembly according to claim 12, wherein the compound is a dye.

15. The positive working thermal imaging assembly according to claim 1, comprising just the first layer on the substrate, the first layer being treated on its upper surface.

16. The positive working thermal imaging assembly according to claim 1, comprising the substrate, the first layer, the first intermediate layer and the third layer.

17. A process for preparing a positive working thermal imaging assembly comprising
   A—a substrate; and
   B—a thermally sensitive imaging element of a composite layer structure; the process comprising
   (i) applying on a substrate a first layer of a first polymeric material soluble in aqueous alkali solution, optionally containing a compound that absorbs and converts light to heat and/or a colored dye or pigment; the first layer being oleophilic;
   (ii) treating the said first layer on a surface thereof with a solution at an elevated temperature that contains an active compound or compounds capable of rendering said first polymeric material less soluble in an aqueous alkali developer at the point of contact, wherein the first layer is treated by contact with solution for 1 to 120 seconds at a temperature of from 50 to 120° C., and wherein said active compound or compounds are polymeric amines, polyacetals, polyethylene glycol, butylated urea formaldehyde, copolymers of vinyl pirrolidone and vinyl acetate, methylated melamine formaldehyde, cellulose esters, or mixtures thereof;
   optionally, and before step (i) applying a first intermediate layer between the substrate and the first layer of a polymeric material which is soluble or dispersible in an aqueous solution and that optionally contains a compound that absorbs and converts light or radiation to heat and/or a colored dye or pigment coated from a solvent that does not substantially dissolve the first layer; and
   optionally, applying a third or top layer over the treated first layer from step (ii); the third or top layer being composed of a polymeric material which is soluble or dispersible in an aqueous solution and that optionally contains a compound that absorbs and converts light or radiation to heat and/or a colored dye or pigment;
   the first intermediate layer and the third layer being applied with a solvent that does not substantially dissolve the treated or converted first layer.

18. The process according to claim 17, wherein the step (ii) is performed by immersing the substrate containing the first layer in a solution at an elevated temperature that contains an active compound or compounds capable of rendering said first polymeric material to less soluble in an aqueous alkali developer at the point of contact.

19. The process according to claim 18, wherein the step (ii) is performed for 10 to 90 seconds at a temperature of from 60 to 100° C.

20. The process according to claim 19, wherein the step (ii) is performed for 20 to 60 seconds at a temperature of from 70 to 90° C.

21. The process according to claim 17, wherein the step (ii) is performed by immersing the substrate containing the first layer in a solution containing a non-solvent for the first layer.

22. The process according to claim 21, wherein the step (ii) is performed by immersing the substrate containing the first layer in a solution containing toluene or water.

23. The process according to claim 17, wherein the active compound is in a solution containing from 0.001 and 0.25 weight % thereof.

24. The process according to claim 23, wherein the active compound is in a solution containing from 0.005 and 0.10 weight % thereof.

25. The process according to claim 17, wherein the active compound is in a solution containing from 0.01 and 0.075 weight % thereof.

26. The process according to claim 17, wherein the polymeric material of the first layer is a phenolic resin, a polyvinylphenol or a mixture thereof.

27. The process according to claim 17, wherein the polymeric material of the first layer is a novolac resin.

28. The process according to claim 17, wherein the first intermediate layer and third layer are applied and the polymeric material of the first intermediate layer and the third layer is selected from the group consisting of polyvinylalcohol, polyvinylpyrrolidone, polyvinylmethyl ether and polyvinylethyl ether.

29. The process according to claim 17, wherein the wherein the compound that absorbs and converts light or radiation to heat is a pigment or dye that absorbs radiation between the wavelengths of 700 and 1200 nm.

30. The process according to claim 29, wherein the compound is a pigment and is milori blue or carbon black.

31. The process according to claim 29, wherein the compound is a dye.

32. The process according to claim 17, wherein only steps (i) and (ii) are performed and the first layer is treated on its the upper surface thereof.

33. The process according to claim 17, wherein the assembly comprises the first layer on the substrate; the first layer being treated on its upper surface thereof; the intermediate layer and the third layer.

34. The process according to claim 17, wherein the step (ii) is performed by applying a coating on the substrate using coating rolls; the coating being formed from a coating solution containing an active compound or compounds capable of rendering said first polymeric material of the first layer less soluble in an aqueous alkali developer at the point of contact.

35. A positive working thermal imaging assembly comprising

A—a substrate; and

B—a thermally sensitive imaging element of a composite layer structure comprising a first layer on the substrate of a polymeric material soluble in an aqueous alkali solution, optionally containing a compound that absorbs and converts light to heat and/or a colored dye or pigment;

said first layer being converted on a surface thereof by treatment with a solution at an elevated temperature that contains an active compound capable of rendering said first polymeric material less soluble in an aqueous alkali developer at the point of contact; the first layer being oleophilic, wherein the first layer is treated by contact with said solution for 1 to 120 seconds at a temperature of from 50 to 120° C., and wherein said active compound or compounds are polymeric amines, polyacetals, polyethylene glycol, butylated urea formaldehyde, copolymers of vinyl pirrolidone and vinyl acetate, methylated melamine formaldehyde, cellulose esters, or mixtures thereof;

a first intermediate layer between the substrate and the first layer of a polymeric material selected from the group consisting of polyvinylalcohol, polyvinylpyrrolidone, polyvinylmethyl ether and polyvinylethyl ether which is soluble or dispersible in an aqueous solution and that optionally contains a compound that absorbs and converts light or radiation to heat and/or a colored dye or pigment coated from a solvent that does not substantially dissolve the first layer; and a third or top layer over the converted first layer and composed of a polymeric material selected from the group consisting of polyvinylalcohol, polyvinylpyrrolidone, polyvinylmethyl ether and polyvinylethyl ether which is soluble or dispersible in an aqueous solution and that optionally contains a compound that absorbs and converts light or radiation to heat and/or a colored dye or pigment; the first intermediate layer and the third layer being applied with a solvent that does not substantially dissolve the converted first layer.

36. A positive working thermal imaging assembly comprising

A—a substrate; and

B—a thermally sensitive imaging element of a composite layer structure comprising a first layer on the substrate of a polymeric material soluble in an aqueous alkali solution, optionally containing a compound that absorbs and converts light to heat and/or a colored dye or pigment;

said first layer being converted on a surface thereof by treatment with a solution at an elevated temperature that contains an active compound or compounds capable of rendering said first polymeric material less soluble in an aqueous alkali developer at the point of contact; the first layer being oleophilic, wherein the first layer is treated by contact with said solution for 1 to 120 seconds at a temperature of from 50 to 120° C., and wherein said active compound or compounds are polymeric amines, polyacetals, polyethylene glycol, butylated urea formaldehyde, copolymers of vinyl pirrolidone and vinyl acetate, methylated melamine formaldehyde, cellulose esters, or mixtures thereof;

a first intermediate layer between the substrate and the first layer of a polymeric material which is soluble or dispersible in an aqueous solution and that optionally contains a compound that absorbs and converts light or radiation to heat and/or a colored dye or pigment coated from a solvent that does not substantially dissolve the first layer; and a third or top layer over the converted first layer and composed of a polymeric material which is soluble or dispersible in an aqueous solution and that optionally contains a compound that absorbs and converts light or radiation to heat and/or a colored dye or pigment; the first intermediate layer and the third layer being applied with a solvent that does not substantially dissolve the converted first layer.

37. A lithographic printing plate, wherein said plate comprises a substrate and a structure B on the same as disclosed in claim 35 or 36.

38. Color proofing films or plates and Photoresist comprising a substrate and a structure B on the same as disclosed in claim 35 or 36.

39. The assembly according to claim 35 or 36, wherein the polymer of the polymeric material of the first layer is a condensation product of phenol, o-chlorophenol, o-, m- or p-cresol, p-hydroxy benzoic acid, 2-naphthol or other aromatic monohydroxy monomer with formaldehyde, acetaldehyde, fural, benzaldehyde, or any other aliphatic or aromatic aldehyde.

40. The assembly according to claim 39, wherein the polymer has a molecular weight in the range from 2,000 to 80,000.

41. The assembly according to claim 40, wherein other polymers are added to the polymer to improve its plate performance; said other polymers being a butylated melamine formaldehyde resin; a butylated urea formaldehyde resin; or a copolymer of vinyl pirrolidone/vinyl acetate.

42. The assembly according to claim 41, wherein the compound that absorbs and converts light to heat is a dye able to absorb radiation from 700 to 1200 nm.

43. The assembly according to claim 41, wherein the layers may contain a dye at 830 nm and another dye at 1064 nm.

44. The assembly according to claim 42, wherein the dye is a pyridyl, quinolinyl, benzoxazolyl, thiazolyl, benzothiazolyl, oxazolyl and selenazolyl dye.

* * * * *